United States Patent [19]

Kasdan

[11] 3,937,580
[45] Feb. 10, 1976

[54] ELECTRO-OPTICAL METHOD FOR MEASURING GAPS AND LINES

[75] Inventor: Harvey Lee Kasdan, Van Nuys, Calif.

[73] Assignee: Recognition Systems, Inc., Van Nuys, Calif.

[22] Filed: July 11, 1974

[21] Appl. No.: 487,588

[52] U.S. Cl. ............ 356/156; 250/550; 350/162 SF; 356/111
[51] Int. Cl.² ........................................ G01B 11/02
[58] Field of Search ....... 350/162 SF; 356/156, 109, 356/111, 199, 200, 238; 250/550, 559, 560, 571

[56] References Cited
UNITED STATES PATENTS

| | | | |
|---|---|---|---|
| 2,959,105 | 11/1960 | Sayanagi | 350/162 SF |
| 3,090,281 | 5/1963 | Maréchal et al. | 350/162 SF |
| 3,773,401 | 11/1973 | Douklias et al. | 350/162 SF |
| 3,788,749 | 1/1974 | George | 350/162 SF |

*Primary Examiner*—Alfred E. Smith
*Assistant Examiner*—Richard A. Rosenberger
*Attorney, Agent, or Firm*—Ralph B. Pastoriza

[57] ABSTRACT

Rather than counting nulls in the diffraction pattern generated by a very narrow line or gap in order to measure its width, the diffraction pattern is optically detected and converted to an analog electrical signal constituting a function of the detected intensities in the diffraction pattern. This function is then converted to a digital form, stored, and then passed to a computer electrically computing the Fourier transform to provide an autocorrelation wave form. This wave form is then plotted in an orthogonal X-Y coordinate system and the break point or extension of a linear segment of the autocorrelation curve relative to the X-axis used to provide a precise measurement of the given width.

1 Claim, 2 Drawing Figures

ELECTRO-OPTICAL METHOD FOR MEASURING GAPS AND LINES

The measurement of extremely narrow width dimensions such as gaps or slits or alternatively extremely small diameter wires or lines by diffraction pattern techniques is well known in the art. Essentially the gap or line the width of which is to be measured is radiated by coherent light to generate a diffraction pattern. By measuring the distance of the $n^{th}$ null from the optical axis, an extremely accurate measurement of the width of the gap or line is obtained. In the case of a narrow gap or slit of width $W$, the relationship between the location of the nulls in the diffraction pattern is given by the following equation:

$$W = n\lambda / \sin \tan^{-1} \frac{U_n}{f}$$

where
$\lambda$ = wavelength of incident radiation
$f$ = focal length of the lens
$n$ = the number of the null
$U_n$ = the distance from the optical axis to the $n^{th}$ null.

An advantage in determining widths with the foregoing technique is the fact that the measurement becomes more accurate the smaller the given width. The reason for increased accuracy with decreased width is the fact that a larger diffraction pattern is generated as the width decreases so that the distance from the optical axis to a given detectable null increases and may therefore be measured with increased relative precision.

The problem of measuring the width of an opaque object such as a thin wire or line on a photo mask is not as simply solved. Some form of aperture must be placed around the opaque object within the optical system. It should be noted here that in some cases such aperture may be the limitation imposed by the finite extent of the optical path. A solution for measuring an opaque object has been to accurately measure an aperture, locate the object precisely within the aperture and then measure the two resulting gaps defined between opposite sides of the object and the left and right edges of the aperture. In cases where a wide variety of opaque lines must be measured, this technique requires a large number of pre-measured apertures. The provision of such large number of pre-measured apertures is particularly necessary if the aperture is also used to isolate the opaque line from surrounding lines in which case a single large aperture cannot be used.

BRIEF DESCRIPTION OF THE PRESENT INVENTION

The present invention contemplates a method and apparatus for measuring given widths in objects either in the form of a gap or a line within an aperture wherein while a diffraction pattern is generated, rather than determining the distance of individual nulls, all of the points in the diffraction pattern are utilized in measuring the gap or line width. As a consequence, the measurement is less sensitive to noise and more accurate than the prior art techniques which in locating the nulls sample only a few points in the diffraction pattern. Moreover, in the case of a line in aperture, there is not required any advance knowledge of the aperture size in effecting the measurement of the width of the line.

Essentially, the present invention is based on an optical and electronic computation of the autocorrelation wave form from the initial optical diffraction pattern.

In accord with the method of the invention, a given width associated with an object is measured by radiating the object with coherent light to cause generation of a diffraction pattern by the given width. This diffraction pattern is detected to provide an analog electrical function. The analog function in turn is then converted to a digital form and from this digital form the Fourier transform is computed to provide the autocorrelation wave form.

It is found that regardless of the width of the gap or the size of a line relative to the size of an aperture surrounding the line, the autocorrelation wave form has certain invariant characteristics. For example, it is found that by measuring a break point position of a linear segment in the autocorrelation wave form there is provided a precise measure of the given width. Thus in completing the method steps, the autocorrelation wave form is plotted on an orthagonal X–Y coordinate system and, in the case of a gap, the point of intersection of the initial line segment of the autocorrelation curve with the X-axis defines the first break point and thus defines the given width of the gap. In the case of a line or solid object in an aperture, wherein the gaps on either side of the line are substantially larger than the given width, the first break point in the initial linear segment of the autocorrelation wave form is projected down to the X-axis to provide the given width of the line. Instead of measuring a break point, it is also possible to determine the given width by measuring X or Y intercepts formed by extending certain linear segments.

BRIEF DESCRIPTION OF THE DRAWINGS

A better understanding of the method and apparatus of this invention will be had by now referring to the accompanying drawings in which.

DETAILED DESCRIPTION OF THE INVENTION

Figure 1:
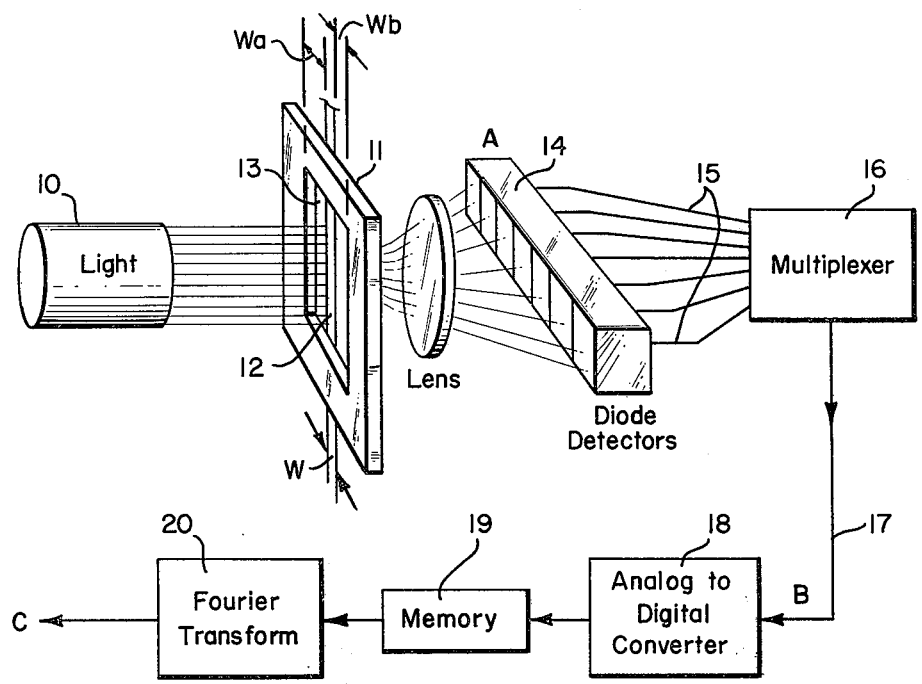
FIG. 1 is a perspective schematic view partly in block form of a basic apparatus for carrying out the measurement of the width of a line or solid object in an aperture; and, FIG. 2 illustrates the determination of the width of both gaps and lines in apertures in accord with the apparatus of FIG. 1, there being illustrated various wave forms occurring at correspondingly lettered points in FIG. 1.

Referring first to FIG. 1, there is shown a coherent light source 10 which may constitute a laser light for radiating an object 11 including a thin wire or line 12 having a given width W to be measured. As shown, this line is positioned in an aperture 13 the left and right edges of the aperture being spaced respectively by distances W$a$ and W$b$.

In accord with the invention, radiation of the given width by the light source 10 results in a diffraction pattern which is detected by a light detector means in the form of a series of diode detectors 14 horizontally positioned in the direction of the given width; that is, perpendicularly to the direction of the line 12. A lens, as shown, may be used to direct light to the detector. The outputs 15 from the diode detectors connect to a multiplexer 16 so that there is provided on an outlet line 17 an analog electrical function of the light intensities in the diffraction pattern.

As shown, the analog electrical function of the light intensities is passed into an analog to digital converter 18. The digitized function from the output of the analog to digital converter is then stored in a memory 19 perparatory to being received in a Fourier transform computer means 20. This computer effects a Fourier transform computation on the digitized signal to provide an autocorrelation wave form.

With respect to the foregoing operation, the optical diffraction pattern represented by a signal at point A in FIG. 1 is optically converted to an analog electrical function at point B, digitized, stored, and electronically transformed to provide the autocorrelation wave form at point C.

Figure 2:
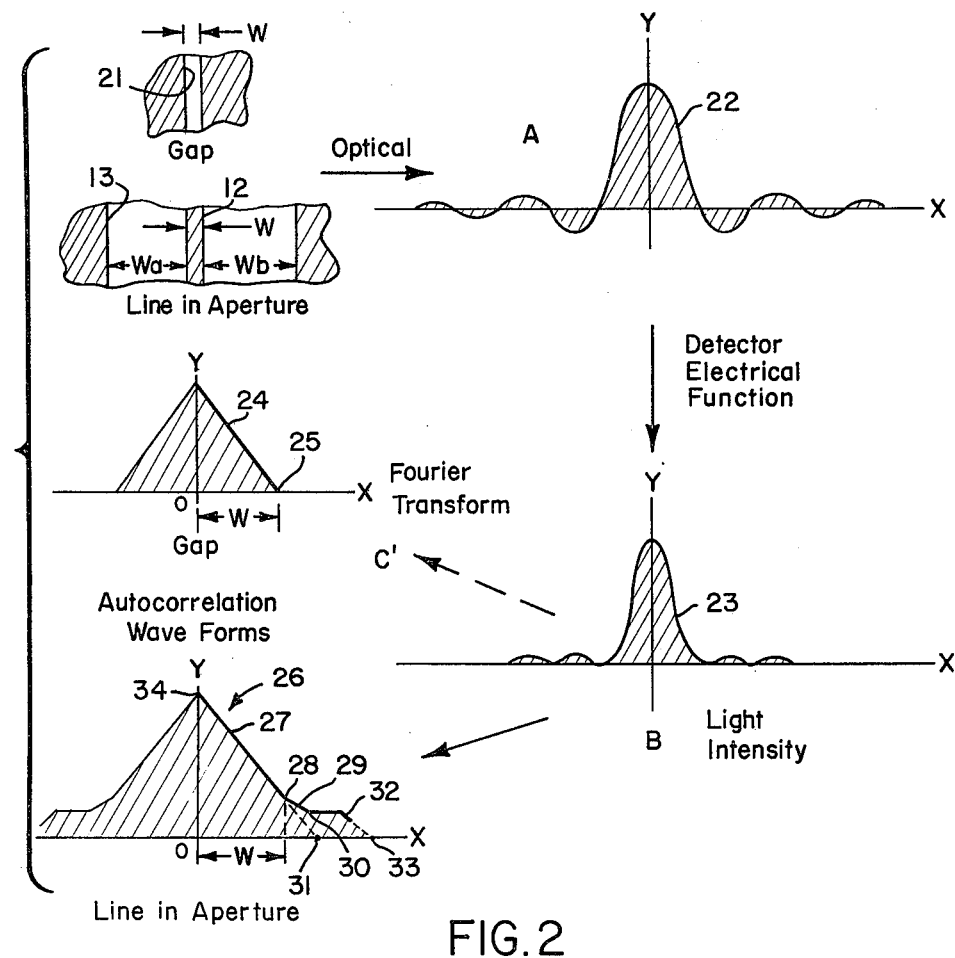

Referring now to FIG. 2, the foregoing technique is illustrated for a gap 21 as well as for the line 12 in the aperture 13. In the case of the gap 21, there is illustrated at 22 the optical diffraction pattern signal corresponding to the point A in FIG. 1.

When the foregoing optical signal is converted to an analog electrical function, this function represents the light intensity which is proportional to the square of the amplitude of the signal 22. This light intensity function is shown at 23 in FIG. 2 and represents the analog electrical signal at point B in FIG. 1.

As described, the digitizing of the function 23 and Fourier transform computation results in an autocorrelation curve shown at 24 in FIG. 2. This particular autocorrelation curve results when the width W of a gap as shown at 21 in FIG. 2 is to be measured.

The discrete points from the Fourier transformation computation are plotted on an orthogonal X-Y coordinate system as shown by the autocorrelation curve 24. The intersection of the initial line segment of this curve with the X-axis is indicated at 25 and represents a first break point. The actual position on the X-axis from the origin corresponds precisely to the width W of the gap 21 and thus it is a simple matter to compute the break point 25 and thus precisely measure the width W.

In the case of the line in the aperture as described in FIG. 1, the resulting autocorrelation wave form is indicated at 26 in FIG. 2. In this particular situation, wherein the distances of the left and right sides of the aperture indicated Wa and Wb are substantially greater than the given width W (at least three times) the first break point in the initial line segment projected down to the X-axis will again provide a precise measure of the width W. Thus, as shown in FIG. 2, the initial line segment is designated 27 and has at its end a first break point 28.

It is important to be able to accurately read the autocorrelation wave forms for certain unique situations. In other words, it is not always true that the X position of the first break point of the initial line segment designates the width W. For example, in the event that the given width W lies between the widths of the gaps on either side of the line W$b$ and W$a$ then the break point of the second linear segment of the autocorrelation curve constituting a second break point in the wave form determines the given width W. For example, with reference to the lower autocorrelation wave form in FIG. 2, the second linear segment is shown at 29 and the second break point at the end of this segment at 30.

In the event that the width W should be greater than both the widths W$a$ and W$b$ then the third linear segment in the autocorrelation wave form is computed and a third break point found at the end of this third segment to define the given width W.

The foregoing considerations are important where the overall size of the aperture results in gaps on either side of the line which are not appreciably different from the given width to be measured. Such situations can arise where the aperture must necessarily be small as in the case of measuring the width of lines in a photo mask used in the manufacture of micro-integrated circuits. Generally, however, the gaps on either side of the line in the aperture will be greater than the given width of the lines so that normally it is the first break point in the initial linear segment of the autocorrelation curve which determines the given width for either a single gap or a line in an aperture.

It is to be appreciated from the foregoing description that essentially all of the light diffraction pattern is utilized to form the autocorrelation wave form so that a substantial increase in accuracy is realizable over prior art methods wherein nulls were utilized to determine the dimension to be measured. Moreover, no advance or a priori knowledge of the aperture is required. [In those instances where the gaps on either side of the line are close in width to the width to be measured, the width can be determined by alternative techniques to that of measuring a break point, as will be pointed out subsequently.]

It will be understood, of course, that the output of the Fourier transform computer 20 in FIG. 1 would normally be in the form of a series of discrete points. In determining the line or gap width, it is necessary to estimate straight lines passing through the points and determine their break points by solving a simple algebraic equation. As pointed out heretofore, since each point in the discrete Fourier transform is a function of all sample points detected, each point is determined very accurately and any random variations from point to point in the sampled wave form are averaged out.

As an alternative to the technique of measuring break points, or in addition thereto, the given width can be determined from other invariants in the autocorrelation wave form. For example, extension of one or more linear segments to define their X-axis or Y-axis intercepts provides information to determine accurately the given width. Thus, when the given width W is greater than the gap widths W$a$ and W$b$, there will always be one line segment of position slope and extension of this line segment to the X-axis provides a direct measure of the given width. As another example and with reference to FIG. 2, the X intercept of the initial segment 27 at point 31 is equal to ½ (W$a$ = W$b$) while the X intercept of segment 32 at point 33 is equal to W$a$ = W$b$ = W. By subtracting twice the value of point 31 from point 33, the given width is determined As in the case of the prior art null measuring techniques, the accuracy of the present method and apparatus increases as the given width to be measured decreases in size. Thus the application of the method and apparatus is particularly advantageous in measuring the extremely narrow lines in photo masks and in measuring extremely narrow gaps or diameters for checking mechanical tolerances.

What is claimed is:

1. A method of measuring a given width, W of a line in an aperture comprising the steps of:
    a. radiating the aperture with coherent light to cause generation of a diffraction pattern by said given width;
    b. detecting said diffraction pattern to provide an analog electrical function;

c. converting said function to a digital form;
d. computing the Fourier transform of said digital form to provide an autocorrelation wave form;
e. plotting the autocorrelation wave form on an orthagonal X-Y coordinate system; and
f. measuring at least one point position determined by a linear segment in the autocorrelation wave form on an axis of said coordinate system to thereby provide a precise measure of said given width, said line being spaced from the left side of said aperture as viewed from the light source by a distance W$a$ and from the right side of the aperture by a distance W$b$, and wherein:
g. if W$a$>W$b$>W then said linear segment constitutes the initial linear segment of said autocorrelation wave form and said point position corresponds to the first break point in said wave form occurring at the end of said initial linear segment;
h. if W$b$>W>W$a$ then said linear segment constitutes the second linear segment, and said point position corresponds to the second break point in said wave form occurring at the end of said second linear segment; and
i. if W>W$a$>W$b$ then said linear segment constitutes the third linear segment, and said point position corresponds to the third break point in said wave form occurring at the end of said third linear segment.

* * * * *

UNITED STATES PATENT OFFICE
CERTIFICATE OF CORRECTION

Patent No. 3,937,580   Dated Feb. 10, 1976

Inventor(s) Harvey Lee Kasdan

It is certified that error appears in the above-identified patent and that said Letters Patent are hereby corrected as shown below:

Column 2, line 21 orthagonal should read --orthogonol--

Column 4, line 45 position should read --positive--

Column 4, line 49 read the = sign as --+--

Column 4, line 50 read each = sign as --+--

In column 5, line 5 read thagonal as --thogonal--

Signed and Sealed this twenty-fifth Day of May 1976

[SEAL]

Attest:

RUTH C. MASON
Attesting Officer

C. MARSHALL DANN
Commissioner of Patents and Trademarks